(12) United States Patent
Nakahara et al.

(10) Patent No.: US 11,421,596 B2
(45) Date of Patent: Aug. 23, 2022

(54) GAS TURBINE CONTROL DEVICE AND METHOD, NON-TRANSITORY STORAGE MEDIUM, AND GAS TURBINE

(71) Applicant: Mitsubishi Hitachi Power Systems, Ltd., Kanagawa (JP)

(72) Inventors: Masahiko Nakahara, Kanagawa (JP); Hidehiko Nishimura, Kanagawa (JP); Yoshie Usune, Kanagawa (JP); Norihisa Kishi, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 601 days.

(21) Appl. No.: 15/745,185

(22) PCT Filed: Sep. 15, 2016

(86) PCT No.: PCT/JP2016/077320
§ 371 (c)(1),
(2) Date: Jan. 16, 2018

(87) PCT Pub. No.: WO2017/051766
PCT Pub. Date: Mar. 30, 2017

(65) Prior Publication Data
US 2018/0209341 A1 Jul. 26, 2018

(30) Foreign Application Priority Data

Sep. 24, 2015 (JP) .............................. JP2015-187092

(51) Int. Cl.
*F02C 7/057* (2006.01)
*F02C 7/042* (2006.01)
(Continued)

(52) U.S. Cl.
CPC ................ *F02C 7/057* (2013.01); *F02C 3/04* (2013.01); *F02C 7/042* (2013.01); *F02C 7/047* (2013.01);
(Continued)

(58) Field of Classification Search
CPC .... F02C 6/08; F02C 7/04; F02C 7/042; F02C 7/047; F02C 7/057; F02C 9/16;
(Continued)

(56) References Cited

U.S. PATENT DOCUMENTS 3,866,109 A * 2/1975 Reed ........................ F02C 3/04
322/15
4,578,944 A * 4/1986 Martens ................ F01K 23/105
122/7 B
(Continued)

FOREIGN PATENT DOCUMENTS

JP    2001-20760    1/2001
JP    2007-40171    2/2007
(Continued)

OTHER PUBLICATIONS

Written Opinion of the International Searching Authority dated Dec. 6, 2016 in International (PCT) Application No. PCT/JP2016/077320.
(Continued)

*Primary Examiner* — Arun Goyal
*Assistant Examiner* — William L Breazeal
(74) *Attorney, Agent, or Firm* — Wenderoth, Lind & Ponack, L.L.P.

(57) ABSTRACT

Provided for a device and a method for controlling a gas turbine, a gas turbine control program, and the gas turbine are: a first opening setting unit that sets a first IGV opening command value for an inlet guide vane based on factors excluding a surge limit of a compressor; a second opening
(Continued)

setting unit that sets a second IGV opening command value for the inlet guide vane based on the surge limit of the compressor, and corrects the second IGV opening command value based on a pressure in the compressor; an opening selecting unit that selects a maximum opening as an IGV opening command value for the inlet guide vane among the first IGV opening command value and the second IGV opening command value; and an opening control unit that adjusts the opening of the inlet guide vane based on the IGV opening command value S selected by the opening selecting unit.

12 Claims, 8 Drawing Sheets

(51) Int. Cl.
| | |
|---|---|
| *F02C 9/18* | (2006.01) |
| *F02C 7/047* | (2006.01) |
| *F02C 9/20* | (2006.01) |
| *F02C 9/00* | (2006.01) |
| *F02C 3/04* | (2006.01) |

(52) U.S. Cl.
CPC .............. *F02C 9/00* (2013.01); *F02C 9/18* (2013.01); *F02C 9/20* (2013.01); *F05D 2220/32* (2013.01); *F05D 2240/35* (2013.01); *F05D 2270/301* (2013.01); *F05D 2270/303* (2013.01)

(58) Field of Classification Search
CPC ...... F02C 9/18; F02C 9/20; F02C 9/22; F02C 9/24; F02C 9/28; F02C 9/50; F02C 9/52; F02C 9/54; F05D 2270/101; F05D 2270/301; F05D 2270/303

See application file for complete search history.

(56) References Cited

U.S. PATENT DOCUMENTS

| | | | | |
|---|---|---|---|---|
| 4,959,954 | A * | 10/1990 | Nishijima | F02C 6/08 60/783 |
| 6,226,974 | B1 * | 5/2001 | Andrew | F02C 9/28 60/772 |
| 7,422,414 | B2 * | 9/2008 | Fujii | F02C 9/20 415/1 |
| 2007/0031238 | A1 | 2/2007 | Fujii et al. | |
| 2014/0257666 | A1 * | 9/2014 | Abrol | F02C 9/48 701/100 |
| 2014/0325990 | A1 | 11/2014 | Takeda et al. | |
| 2014/0356122 | A1 * | 12/2014 | Hatcher, Jr. | G01M 15/14 415/1 |
| 2015/0322861 | A1 * | 11/2015 | Scipio | F02C 7/185 60/39.23 |

FOREIGN PATENT DOCUMENTS

| | | |
|---|---|---|
| JP | 2011-032869 | 2/2011 |
| JP | 2013-76388 | 4/2013 |
| JP | 2013-209917 | 10/2013 |
| JP | 2014-098374 | 5/2014 |

OTHER PUBLICATIONS

International Search Report dated Dec. 6, 2016 in International (PCT) Application No. PCT/JP2016/077320.

* cited by examiner

GAS TURBINE CONTROL DEVICE AND METHOD, NON-TRANSITORY STORAGE MEDIUM, AND GAS TURBINE

CROSS REFERENCE TO RELATED APPLICATION

This application is a national stage of PCT International Application No. PCT/JP2016/077320 filed in Japan on Sep. 15, 2016, which claims priority to and incorporates by reference the entire contents of Japanese Patent Application No. 2015-187092 filed in Japan on Sep. 24, 2015.

FIELD

The present application relates to a device and a method for controlling a gas turbine having a compressor, a combustor, and a turbine, a non-transitory storage medium that stores a gas turbine control program, and a gas turbine having the device for controlling the gas turbine.

BACKGROUND

A general gas turbine is formed of a compressor, a combustor, and a turbine. By a compressor compressing air taken in from an air intake port, the air is turned into high temperature and high pressure compressed air, and by fuel supplied to this compressed air to be combusted in a combustor, high temperature and high pressure combustion gas (working fluid) is obtained. A turbine is driven by this combustion gas, and a generator connected to this turbine is driven.

In such a gas turbine, an inlet guide vane (IGV) is provided at an air intake port of a compressor therein, and opening of this inlet guide vane is adjusted based on output (load value) of the gas turbine and the like. Further, when this opening of the IGV in the compressor is small, amount of air taken in is decreased and a surging phenomenon may be caused, and thus a lower limit is set for this opening of the IGV.

When the gas turbine is operated in a state where ambient temperature is low, temperature of air flowing through the IGV may be decreased to a temperature below the freezing point and moisture in the air may freeze, and thus an anti-icing function for increasing temperature of air that flows into the compressor is provided. This anti-icing function is for preventing freezing at the air intake port by guiding a part of high temperature compressed air generated in the compressor to the air intake port through an extraction air pipe. Further, the anti-icing function enables partial load operation of the gas turbine by maintaining turbine inlet temperature, and thereby carbon monoxide (CO) in exhaust gas is able to be reduced and emission is able to be warranted.

When a part of the compressed air generated in the compressor is extracted at the time of anti-icing operation, compressed air for combustion in the combustor will be reduced, and the opening of the IGV will need to be corrected to be larger. Such techniques include, for example, a technique described in Japanese Laid-open Patent Publication No. 2011-032869. In a method of operating a gas turbine described in Japanese Laid-open Patent Publication No. 2011-032869, opening of an inlet guide vane is calculated according to an output command value to the gas turbine, and a larger opening is selected as an opening of the IGV from turbine operation actualization openings calculated based on an intake air temperature and an intake air humidity.

SUMMARY

At the time of anti-icing operation, when a part of compressed air generated in the compressor is extracted, casing pressure therein is reduced, and thus occurrence of the surging phenomenon is mitigated. However, this is not reflected in control of the opening of the IGV based on the output (load value) of the gas turbine, and thus the IGV is controlled to the open side more than necessary. In this case, increasing extraction air flow of the compressed air may be considered, but this has a problem that the increase in the extraction air flow leads to increase size of the extraction air piping and valve, and thus the manufacturing cost is increased. Further, when the intake air flow rate is too large, workload of the compressor is increased and thus generating efficiency is decreased.

The present application solves the above described problems, and an object thereof is to provide a device and a method for controlling a gas turbine, a gas turbine control program, and the gas turbine, which lead to reduction of carbon monoxide and warranty of emission, and prevention of increase in manufacturing cost due to enlargement of facilities, by obtaining optimum intake air flow rate for a compressor.

According to one aspect of the present application, there is provided a gas turbine control device in a gas turbine comprising a compressor, a combustor, a turbine, an inlet guide vane provided at an air intake port of the compressor and configured to adjust an amount of air flowing into the compressor, and an extraction air flow channel through which a part of air compressed by the compressors extracted, wherein the gas turbine control device has a second opening setting unit configured to set a second opening for the inlet guide vane based on a surge limit of the compressor and correct the second opening based on a pressure in the compressor, a first opening setting unit configured to set a first opening for the inlet guide vane by control different from that of the second opening setting unit, an opening selecting unit configured to select a maximum opening as an opening for the inlet guide vane among the first opening and the second opening, and an opening control unit configured to adjust the opening of the inlet guide vane based on the selected opening for the inlet guide vane selected by the opening selecting unit.

Therefore, the first opening for the inlet guide vane is set by the control different from that of the second opening setting unit, the second opening for the inlet guide vane is set based on the surge limit of the compressor and corrected based on the pressure in the compressor, the maximum opening is selected as the opening for the inlet guide vane among the first opening and the second opening, and the opening of the inlet guide vane is adjusted based on the selected opening for the inlet guide vane. Therefore, the second opening for the inlet guide vane set based on the surge limit of the compressor is able to be corrected based on the pressure in the compressor. When the part of the compressed air in the compressor is extracted through the extraction air flow channel, the pressure in the compressor is decreased, and thereby occurrence of the surging phenomenon in the compressor is mitigated. At this time, the opening for the inlet guide vane is corrected based on the pressure in the compressor, thus the intake air flow rate is prevented from increasing more than necessary and optimum intake air flow rate is able to be obtained for the compressor. As a result, carbon monoxide in the exhaust gas is able to be reduced and emission is able to be warranted, and increase in manufacturing cost due to enlargement of the facilities is able to be prevented.

In the gas turbine control device according to one aspect of the present application, the first opening setting unit is further configured to set the first opening for the inlet guide vane based on factors excluding a surge limit of the compressor.

Therefore, the first opening setting unit is able to set the first opening for the inlet guide vane highly accurately based on the factors excluding the surge limit of the compressor.

In the gas turbine control device according to one aspect of the present application, the pressure in the compressor is at least any one of a casing pressure in the compressor, a casing pressure ratio calculated based on an atmospheric pressure and the casing pressure, and an estimated casing pressure or estimated casing pressure ratio estimated based on a pressure at a predetermined position in the compressor.

Therefore, by use of the pressure in the compressor which is the casing pressure, the casing pressure ratio, the estimated casing pressure, or the estimated casing pressure ratio, the second opening is able to be set highly accurately.

In the gas turbine control device according to one aspect of the present application, the second opening setting unit is further configured to set the second opening based on parameters excluding the pressure in the compressor and correct the second opening based on the casing pressure ratio.

Therefore, by correcting the second opening based on the pressure of the compressor by the second opening setting unit, the intake air flow rate is prevented from increasing more than necessary, and optimum intake air flow rate is able to be obtained for the compressor.

In the gas turbine control device according to one aspect of the present application, the second opening setting unit has a first calculating unit configured to set a first minimum opening for the inlet guide vane based on a first state of the surge limit in which a predetermined extraction air flow rate through the extraction air flow channel is obtained, and a second calculating unit configured to set a second minimum opening for the inlet guide vane based on a second state of the surge limit in which a extraction flow rate through the extraction air flow channel is larger than that in the first state.

Therefore, the first minimum opening is set based on the surge limit when the extraction air flow rate is small and the second minimum opening is set based on the surge limit when the extraction air flow rate is large, and thereby, regardless of whether the extraction air flow rate is large or small, the opening for the inlet guide vane in consideration of the surge limit is able to be set properly.

In the gas turbine control device according to one aspect of the present application, the first calculating unit is further configured to calculate the first minimum opening based on parameters excluding the pressure in the compressor, and the second calculating unit is further configured to calculate the second minimum opening based on the pressure in the compressor.

Therefore, the first minimum opening is calculated based on the parameters excluding the pressure in the compressor, the second minimum opening is calculated based on the pressure in the compressor, thereby the second minimum opening is set based on the pressure in the compressor and the surge limit when the extraction air flow rate is large, and thus the intake air flow rate is able to be prevented from increasing more than necessary when the extraction air flow rate is large.

In the gas turbine control device according to one aspect of the present application, the second opening setting unit has a difference calculating unit configured to calculate a difference between the first minimum opening and the second minimum opening, and an adding unit configured to add the difference calculated by the difference calculating unit to the first minimum opening calculated by the first calculating unit.

Therefore, since the opening for the inlet guide vane in consideration of the surge limit of the compressor is set by adding the difference between the first minimum opening and the second minimum opening to the first minimum opening, regardless of magnitude of the extraction air flow rate, the opening for the inlet guide vane in consideration of the surge limit is able to be set properly.

In the gas turbine control device according to one aspect of the present application, a limiting and correcting unit configured to correct the difference calculated by the difference calculating unit such that the difference is between a predetermined upper limit and a predetermined lower limit is provided.

Therefore, by the setting of the upper limit and the lower limit for the difference between the first minimum opening and the second minimum opening, the difference is prevented from becoming an abnormal value, and a large increase or decrease in the intake air flow rate due to an abnormal change in the opening of the inlet guide vane is able to be prevented.

In the gas turbine control device according to one aspect of the present application, the second opening setting unit has an opening correcting unit configured to correct the second minimum opening based on the pressure in the compressor, and an adding unit configured to add the difference between the first minimum opening and the corrected second minimum opening to the first minimum opening.

Therefore, by correcting the second minimum opening when the extraction air flow rate is large based on the pressure in the compressor, and adding the difference between the first minimum opening and the corrected second minimum opening to the first minimum opening, the opening for the inlet guide vane based on the pressure in the compressor is able to be set properly.

In the gas turbine control device according to one aspect of the present application, the first opening setting unit is further configured to set a minimum opening for the inlet guide vane based on an inlet temperature of the turbine.

Therefore, by setting the minimum opening for the inlet guide vane based on the inlet temperature of the turbine, carbon monoxide in the exhaust gas is able to be reduced and emission is able to be warranted.

In the gas turbine control device according to one aspect of the present application, the opening control unit is further configured to set an opening speed of the inlet guide vane to be faster than a closing speed of the inlet guide vane.

Therefore, by opening the inlet guide vane quickly when the opening of the inlet guide vane is increased, and closing the inlet guide vane slowly when the opening of the inlet guide vane is decreased, the exhaust gas temperature is able to be prevented from decreasing suddenly and emission is able to be warranted.

In the gas turbine control device according to one aspect of the present application, the extraction air flow channel is further configured to extract the part of air compressed by the compressor and guide the extracted part to the air intake port of the compressor.

Therefore, freezing at the air intake port is prevented by extracting the part of air compressed by the compressor and guiding the extracted part to the air intake port through the extraction air flow channel.

According to one aspect of the present application, there is provided a gas turbine control method in a gas turbine comprising a compressor, a combustor, a turbine, an inlet guide vane provided at an air intake port of the compressor and configured to adjust an amount of air flowing into the compressor, and an extraction air flow channel through which a part of air compressed by the compressor is extracted, the method comprising a second opening setting step of setting a second opening for the inlet guide vane based on a surge limit of the compressor and correcting the second opening based on a pressure in the compressor, a first opening setting step of setting a first opening for the inlet guide vane by control different from that of the second opening setting step, an opening selecting step of selecting a maximum opening as an opening for the inlet guide vane among the first opening and the second opening, and an opening control step of adjusting the opening of the inlet guide vane based on the selected opening for the inlet guide vane.

When the part of compressed air in the compressor is extracted via the extraction air flow channel, the pressure in the compressor is reduced, and thereby the occurrence of the surging phenomenon in the compressor is mitigated. At that time, the opening for the inlet guide vane is corrected based on the pressure in the compressor, thus the intake air flow rate is prevented from increasing more than necessary and optimum intake air flow rate is able to be obtained for the compressor. As a result, carbon monoxide in the exhaust gas is able to be reduced and emission is able to be warranted, and increase in the manufacturing cost due to the enlargement of the facilities is able to be prevented.

According to one aspect of the present application, there is provided a non-transitory storage medium that stores a gas turbine control program in a gas turbine comprising a compressor, a combustor, a turbine, an inlet guide vane provided at an air intake port of the compressor and configured to adjust an amount of air flowing into the compressor, and a extraction air flow channel through which a part of air compressed by the compressor is extracted, the program causing a computer to execute a second opening setting step of setting a second opening for the inlet guide vane based on a surge limit of the compressor and correcting the second opening based on a pressure in the compressor, a first opening setting step of setting a first opening for the inlet guide vane by control different from that of the second opening setting step, an opening selecting step of selecting a maximum opening as an opening for the inlet guide vane among the first opening and the second opening, and an opening control step of adjusting the opening of the inlet guide vane based on the selected opening for the inlet guide vane.

When the part of compressed air in the compressor is extracted via the extraction air flow channel, the pressure in the compressor is reduced, and thereby the occurrence of the surging phenomenon in the compressor is mitigated. At that time, the opening for the inlet guide vane is corrected based on the pressure in the compressor, thus the intake air flow rate is prevented from increasing more than necessary and optimum intake air flow rate is able to be obtained for the compressor. As a result, carbon monoxide in the exhaust gas is able to be reduced and emission is able to be warranted, and increase in the manufacturing cost due to the enlargement of the facilities is able to be prevented.

According to according to one aspect of the present application, there is provided a gas turbine comprising a compressor, a combustor, a turbine, an inlet guide vane provided at an air intake port of the compressor and configured to adjust an amount of air flowing into the compressor, an extraction air flow channel through which a part of air compressed by the compressor is extracted, and the gas turbine control device described above.

When the part of compressed air in the compressor is extracted via the extraction air flow channel, the pressure in the compressor is reduced, and thereby the occurrence of the surging phenomenon in the compressor is mitigated. At that time, the opening for the inlet guide vane is corrected based on the pressure in the compressor, thus the intake air flow rate is prevented from increasing more than necessary and optimum intake air flow rate is able to be obtained for the compressor. As a result, carbon monoxide in the exhaust gas is able to be reduced and emission is able to be warranted, and increase in the manufacturing cost due to the enlargement of the facilities is able to be prevented.

According to a device and a method for controlling a gas turbine, a storage medium that stores a gas turbine control program, and the gas turbine of the present application, a first opening for an inlet guide vane is set by control different from that of the second opening setting unit, a second opening for the inlet guide vane is set from a surge limit of a compressor and corrected according to a pressure in the compressor, a maximum opening is selected as an opening for the inlet guide vane from the first opening and the second opening, and an opening of the inlet guide vane is adjusted according to the selected opening for the inlet guide vane. Thus intake air flow rate is prevented from increasing more than necessary and optimum intake air flow rate is able to be obtained for the compressor. As a result, carbon monoxide in exhaust gas is able to be reduced and emission is able to be warranted, and increase in manufacturing cost due to enlargement of facilities is able to be prevented.

The above and other objects, features, advantages and technical and industrial significance of this application will be better understood by reading the following detailed description of presently preferred embodiments of the disclosure, when considered in connection with the accompanying drawings.

DESCRIPTION OF EMBODIMENTS

Hereinafter, preferred embodiments of a device and a method for controlling a gas turbine, a gas turbine control program, and the gas turbine of the present application will be described in detail, by reference to the appended drawings. The present application is not limited by these embodiments, and when there are plural embodiments, the present includes those configured by combination of any of these embodiments.

First Embodiment

Figure 8:
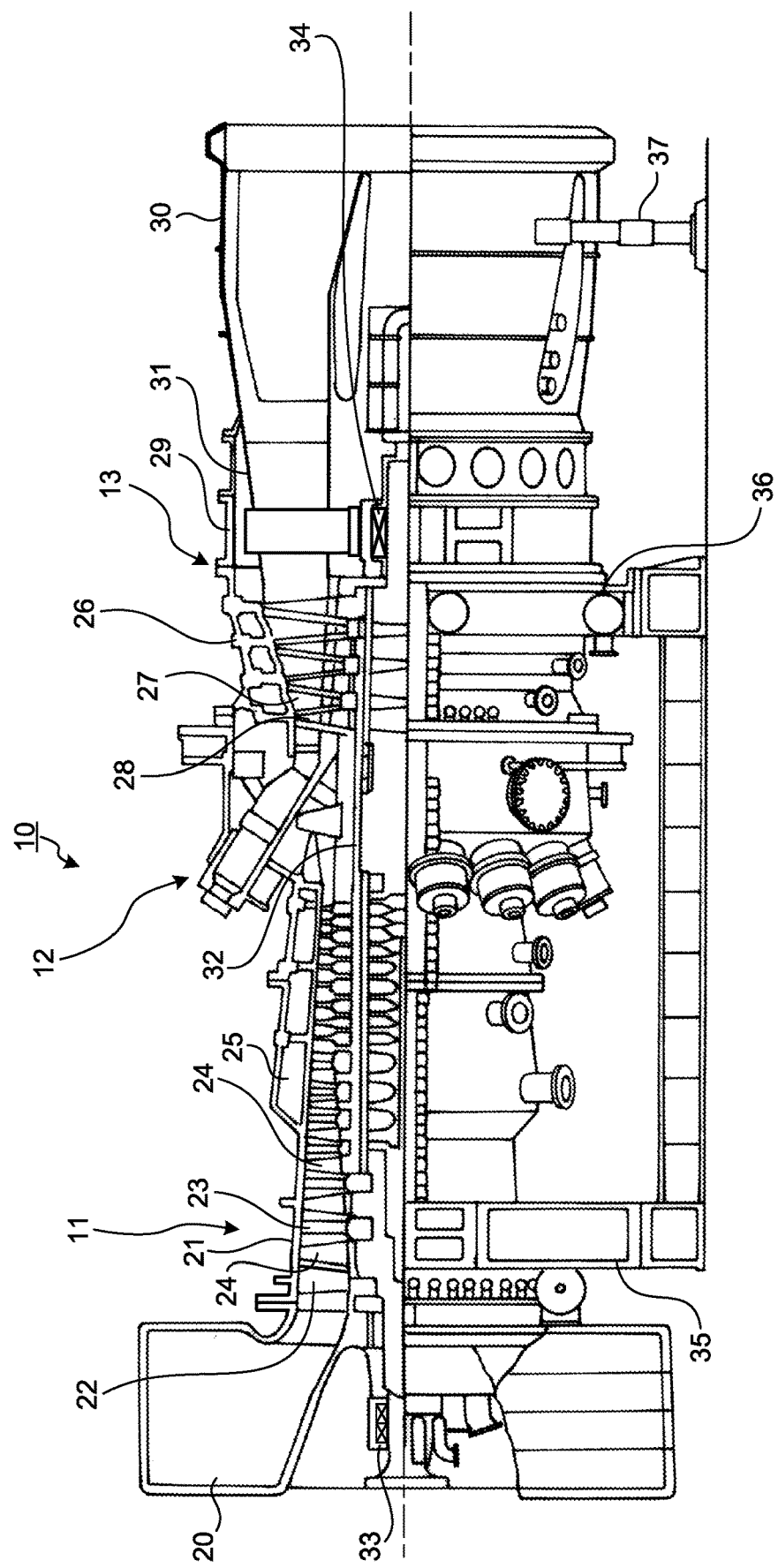
FIG. 8 is a schematic configuration diagram illustrating a gas turbine of the first embodiment.

FIG. 8 is a schematic block diagram illustrating a gas turbine of a first embodiment.

In the first embodiment, as illustrated in FIG. 8, a gas turbine 10 is formed of a compressor 11, a combustor 12, and a turbine 13. A generator not illustrated is connected coaxially with this gas turbine 10, and thereby electricity is able to be generated.

The compressor 11 has an air intake port 20, through which air is taken in, an inlet guide vane (IGV) 22 arranged in a compressor casing 21, plural compressor vanes 23 and compressor blades 24 alternately arranged in a front-rear direction (an axial direction of a rotor 32 described later), and a extraction air chamber 25 provided outside thereof. The combustor 12 enables combustion by supplying fuel to compressed air compressed in the compressor 11 and causing ignition thereof. The turbine 13 has plural turbine vanes 27 and turbine blades 28 alternately arranged in the front-rear direction (the axial direction of the rotor 32 described later) in a turbine casing 26 thereof. An exhaust chamber 30 is arranged downstream of this turbine casing 26 via an exhaust casing 29, and the exhaust chamber 30 has an exhaust diffuser 31 connected to the turbine 13.

Further, the rotor (rotating shaft) 32 is positioned so as to penetrate through a central portion of the compressor 11, the combustor 12, the turbine 13, and the exhaust chamber 30. An end portion of the rotor 32 at the compressor 11 side is freely and rotatably supported by a bearing 33, and another end portion of the rotor 32 at the exhaust chamber 30 side is freely and rotatably supported by a bearing 34. Plural discs installed with the compressor blades 24 are overlapped with one another and fixed to this rotor 32 in the compressor 11, plural discs installed with the turbine blades 28 are overlapped with one another and fixed to the rotor 32 in the turbine 13, and a driving shaft of the generator not illustrated is connected to the end portion of the rotor at the exhaust chamber 30 side.

In this gas turbine 10, the compressor casing 21 of the compressor 11 is supported by a leg portion 35, the turbine casing 26 of the turbine 13 is supported by a leg portion 36, and the exhaust chamber 30 is supported by a leg portion 37.

Therefore, air taken in from the air intake port 20 of the compressor 11 is turned into high temperature and high pressure compressed air by passing through and being compressed in the inlet guide vane 22, the plural compressor vanes 23 and compressor blades 24. In the combustor 12, a predetermined fuel is supplied to this compressed air to be combusted. High temperature and high pressure combustion gas, which is working fluid generated in this combustor 12, passes through the plural turbine vanes 27 and turbine blade 28 forming the turbine 13, thereby driving the rotor 32 to be rotated and driving the generator connected to this rotor 32. The combustion gas that has driven the turbine 13 is emitted to the atmosphere as exhaust gas.

In the gas turbine 10 configured as described above, the compressor 11 has the inlet guide vane (IGV) 22 provided at the air intake port 20, and opening of this inlet guide vane 22 is adjusted based on a load value, an intake air temperature, and the like of the gas turbine 10. Further, if temperature of air taken in by the compressor 11 is low, moisture in the air may freeze, and thus the compressor 11 is provided with an anti-icing (AI) function of guiding a part of compressed air in the compressor to the air intake port 20 and increasing the intake air temperature. When the compressed air in the compressor 11 is extracted at the time of anti-icing operation, casing pressure is decreased and occurrence of a surging phenomenon is mitigated. Since high temperature compressed air is introduced into the compressor 11, the intake air temperature is increased, the opening of the inlet guide vane 22 is increased, and intake air flow rate that inhibits the surging phenomenon is introduced therein more than necessary.

A gas turbine control device of the first embodiment adjusts the intake air flow rate of the compressor 11 to an optimum value by making the opening of the inlet guide vane 22 a proper opening even at the time of the anti-icing operation.

Figure 1:
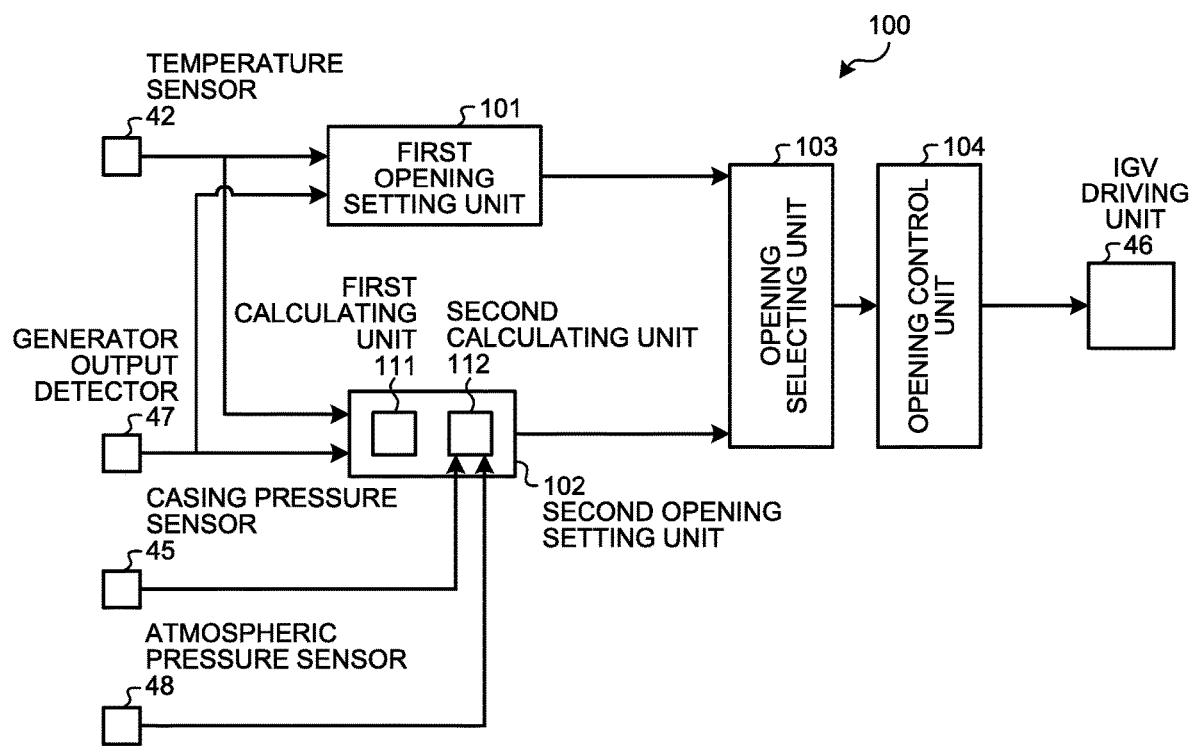
FIG. 1 is a block diagram illustrating a gas turbine control device of a first embodiment.
Figure 2:
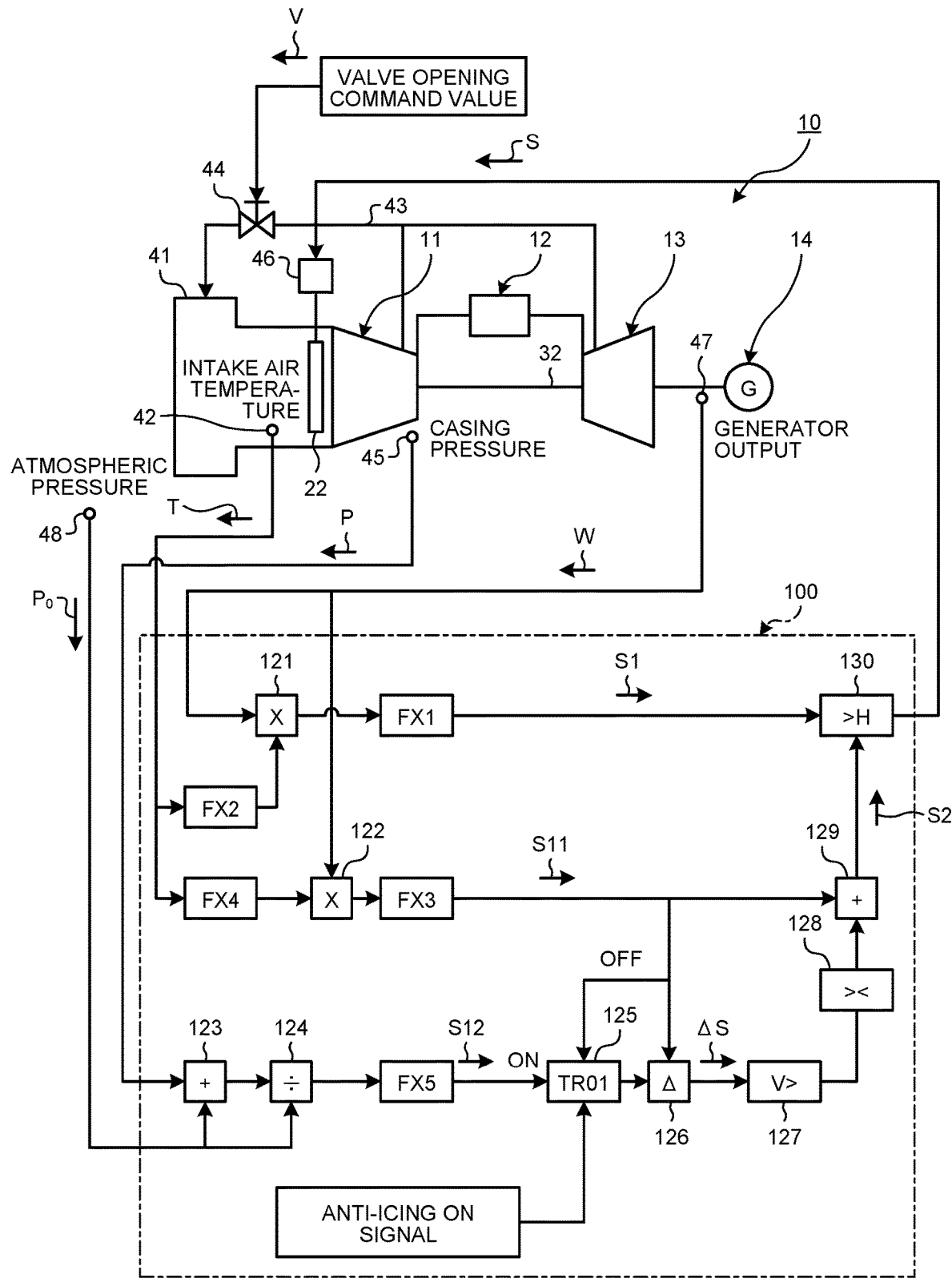
FIG. 2 is a schematic block diagram illustrating a specific configuration of the gas turbine control device of the first embodiment.

FIG. 1 is a block diagram illustrating the gas turbine control device of the first embodiment, and FIG. 2 is a schematic block diagram illustrating a specific configuration of the gas turbine control device of the first embodiment.

In the first embodiment, as illustrated in FIG. 1, a control device 100 of the gas turbine 10 has a first opening setting unit 101, a second opening setting unit 102, an opening selecting unit 103, and an opening control unit 104. The second opening setting unit 102 has a first calculating unit 111 and a second calculating unit 112.

As illustrated in FIG. 2, the gas turbine 10 is formed of the compressor 11, the combustor 12, the turbine 13, a generator 14, and the control device 100.

A duct 41 is connected to an upstream side of the compressor 11, and a temperature sensor 42 is provided inside the duct 41. The temperature sensor 42 detects a temperature of air taken in by the duct 41, and outputs the detected temperature as an intake air temperature value T to the control device 100. Further, the compressor 11 has an extraction air flow channel 43 provided therein. The extraction air flow channel 43 returns a part of compressed air that has been compressed in the compressor 11 to the duct 41 upstream of the compressor 11. The extraction air flow channel 43 has a flow regulating valve 44 provided at an intermediate portion thereof. Opening of the flow regulating valve 44 is controlled by a valve opening command value V output from the control device.

Further, the compressor 11 has a casing pressure sensor 45 provided inside the compressor casing 21 (see FIG. 8). The casing pressure sensor 45 outputs a casing pressure detected as a casing pressure P to the control device 100. The compressor 11 has, as described already, the inlet guide vane (IGV) 22 provided in the air intake port 20. The inlet guide vane 22 is a variable vane that adjusts the amount of air (intake air flow rate) taken in by the compressor 11 according to output (load) of the gas turbine 10, and is driven and controlled by an IGV driving unit 46. The load of the gas turbine 10 is detected by a generator output detector 47 provided in the generator 14, and the generator output detector 47 outputs a detected value as a load value W to the control device 100.

Further, an atmospheric pressure sensor 48 is provided around the gas turbine. The atmospheric pressure sensor 48 detects an atmospheric pressure, and outputs the detected atmospheric pressure as an atmospheric pressure $P_0$ to the control device 100.

As illustrated in FIG. 1 and FIG. 2, the first opening setting unit 101 sets a first opening for the inlet guide vane 22 from factors excluding a surge limit of the compressor 11. This first opening is a minimum opening for the inlet guide vane 22 which is set based on an inlet temperature of the turbine 13. That is, when the opening of the inlet guide vane 22 is increased, the inlet temperature of the turbine 13 is increased, and when the opening of the inlet guide vane 22 is decreased, the inlet temperature of the turbine 13 is decreased. In this case, an upper limit needs to be set for the inlet temperature of the turbine 13 according to the melting point of the material forming the turbine 13. Therefore, the first opening setting unit 101 needs to set the first opening with a certain margin such that the inlet temperature of the turbine 13 does not exceed this upper limit.

The second opening setting unit 102 sets a second opening for the inlet guide vane 22 from the surge limit of the compressor 11, and corrects the second opening according to a pressure in the compressor 11. This second opening is a minimum opening for the inlet guide vane 22 that is set for inhibition of occurrence of surging in the compressor 11. In other words, the second opening is an opening corresponding to a minimum opening that prevents occurrence of surging with a certain margin. The opening selecting unit 103 selects a maximum opening as an opening for the inlet guide vane 22 among the first opening and the second opening. The opening control unit 104 adjusts the opening of the inlet guide vane 22 according to the opening for the inlet guide vane 22 selected by the opening selecting unit 103.

Specifically, the intake air temperature value T is input from the temperature sensor 42 and the load value W is input from the generator output detector 47 to the first opening setting unit 101, and the first opening setting unit 101 sets, based on these intake air temperature value T and load value W, a first IGV opening command value S1 for the inlet guide vane 22. In the second opening setting unit 102, the intake air temperature value T is input from the temperature sensor 42 and the load value W is input from the generator output detector 47 to the first calculating unit 111, and based on these intake air temperature value T and load value W, in consideration of the surge limit of the compressor 11 and the anti-icing operation, the first calculating unit 111 sets a second IGV opening command value S2 for the inlet guide vane 22. Further, based on a casing pressure ratio PR as the pressure in the compressor 11, the second calculating unit 112 corrects the second IGV opening command value S2. The opening selecting unit 103 selects a maximum IGV opening command value S as an IGV opening command value S for the inlet guide vane 22 among the first IGV opening command value S1 and the second IGV opening command value S2. The opening control unit 104 controls the IGV driving unit 46 according to the IGV opening command value S for the inlet guide vane 22 selected by the opening selecting unit 103, and adjusts the opening of the inlet guide vane 22.

In this case, the first opening setting unit 101, and the first calculating unit 111 of the second opening setting unit 102 set the first IGV opening command value S1 and the second IGV opening command value S2 from parameters excluding the casing pressure ratio PR, and the second calculating unit 112 of the second opening setting unit 102 corrects the second IGV opening command value S2 according to the casing pressure ratio PR.

The first calculating unit 111 sets, based on the parameters excluding the casing pressure ratio PR (in this embodiment, the intake air temperature value and the load value) in a first state of a surge limit in which the extraction air flow rate through the extraction air flow channel 43 is small, a first minimum IGV opening command value S11 for the inlet guide vane 22, and the second calculating unit 112 sets, based on the casing pressure ratio PR in a second state of a surge limit in which the extraction air flow rate through the extraction air flow channel 43 is larger than that in the first state, a second IGV minimum opening command value S12 for the inlet guide vane 22. The first state is a state where the flow regulating valve 44 is closed and anti-icing is not in operation, and extraction air is being used only for cooling of a high temperature portion of the turbine 13. Further, the second state is a state where the flow regulating valve 44 is open and anti-icing is in operation, and extraction air is supplied to both the air intake port 20 of the compressor 11 and the high temperature portion of the turbine 13. The second opening setting unit 102 has a difference calculating unit that calculates a difference ΔS between the first IGV minimum opening command value S11 and the second IGV minimum opening command value S12, and an adding unit that adds the difference ΔS calculated by the difference calculating unit to the first IGV minimum opening command value S11. Furthermore, a limiting and correcting unit, which corrects the difference ΔS calculated by the difference calculating unit such that the difference ΔS is between a predetermined upper limit and a predetermined lower limit, is provided. Moreover, the opening control unit 104 sets an opening speed of the inlet guide vane 22 and a closing speed of the inlet guide vane 22 such that the opening speed of the inlet guide vane 22 is faster than the closing speed of the inlet guide vane 22.

The control device 100 not only sets the IGV opening command value S for control of the opening of the inlet guide vane 22, but also sets the valve opening command value V value for control of valve opening of the flow regulating valve 44 for the anti-icing operation. This valve opening command value V is calculated based on the intake air temperature value T.

Specifically, the control device 100 sets the IGV opening command value S for the inlet guide vane 22 by using a first correction function FX1, a second correction function FX2, a third correction function FX3, a fourth correction function FX4, and a fifth correction function FX5.

Figure 3:
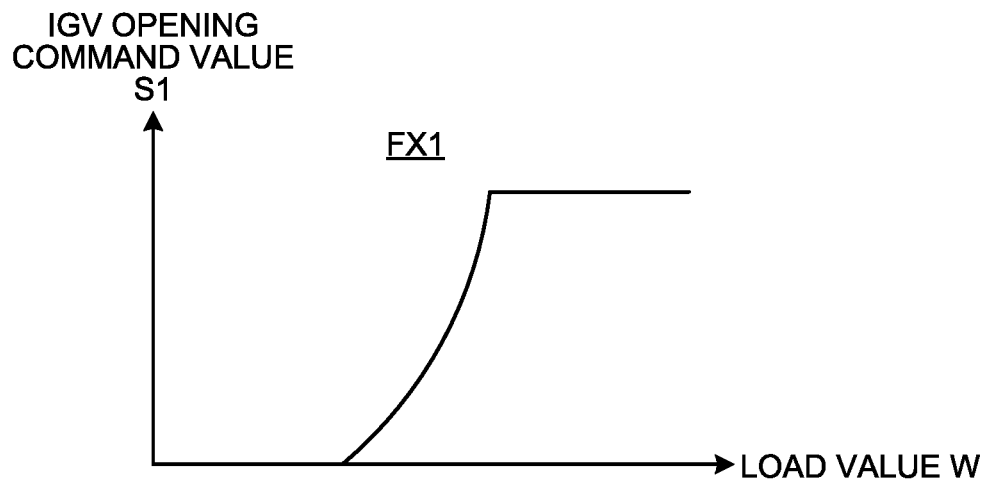
FIG. 3 is a graph representing a first correction function.
Figure 4:
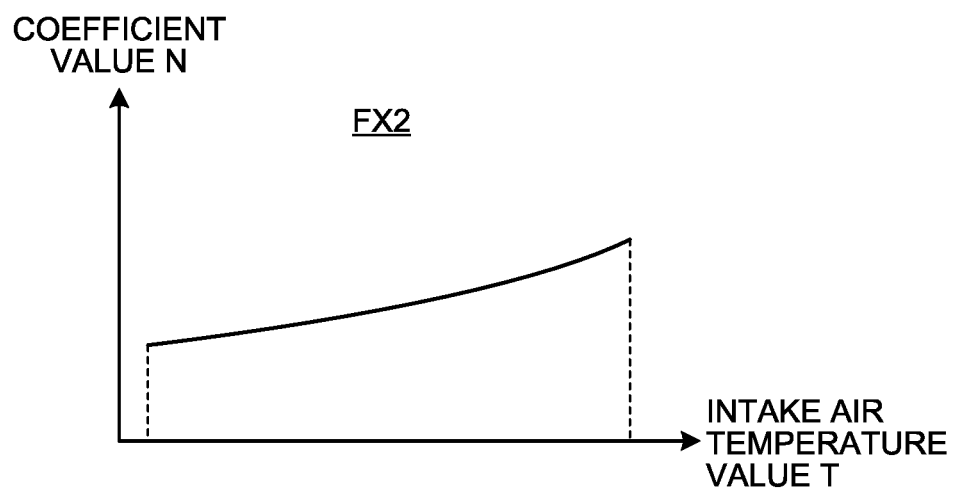
FIG. 4 is a graph representing a second correction function.
Figure 5:
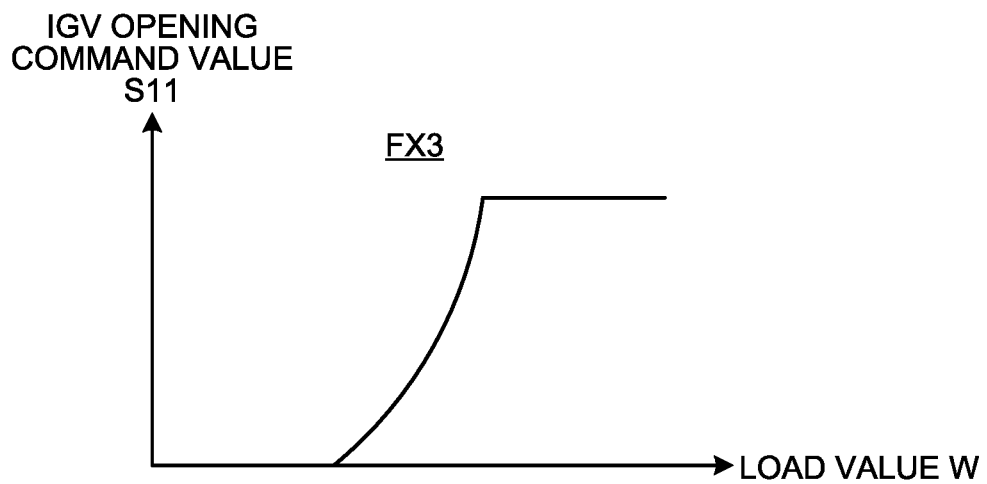
FIG. 5 is a graph representing a third correction function.
Figure 6:
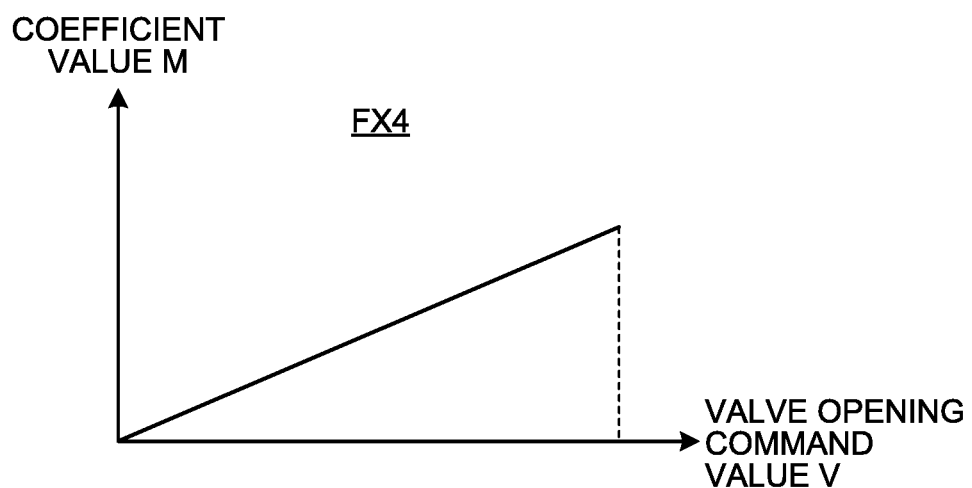
FIG. 6 is a graph representing a fourth correction function.
Figure 7:
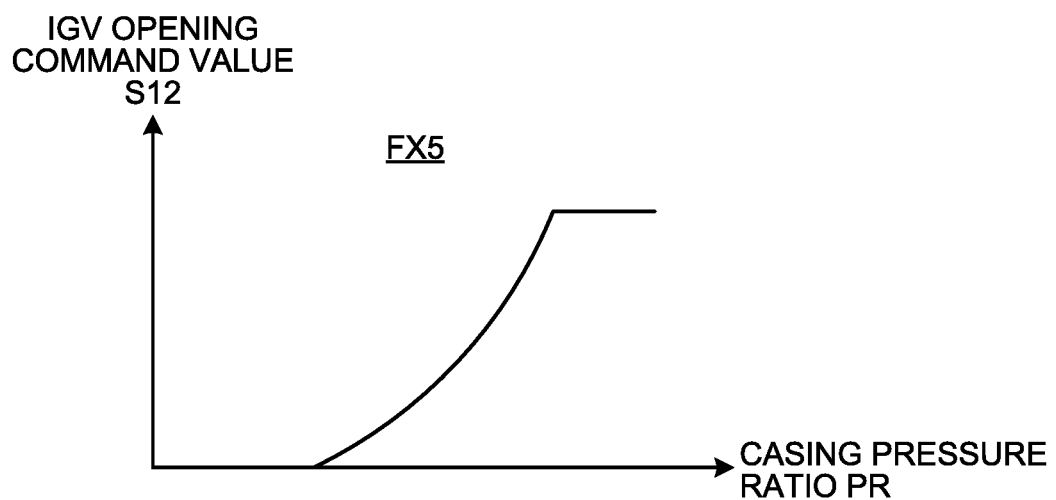
FIG. 7 is a graph representing a fifth correction function.

Hereinafter, functions of the correction functions FX1 to FX5 will be described. FIG. 3 is a graph representing the first correction function, FIG. 4 is a graph representing the second correction function, FIG. 5 is a graph representing the third correction function, FIG. 6 is a graph representing the fourth correction function, and FIG. 7 is a graph representing the fifth correction function.

The first correction function FX1 is a function for finding an opening (IGV opening) for the inlet guide vane 22 for generating an amount of combustion air for a load of the gas turbine 10. For example, the first correction function FX1 has a function of decreasing the intake air flow rate of the compressor 11 by decreasing the IGV opening when the load is small, and increasing the intake air flow rate of the compressor 11 by increasing the IGV opening when the load is large. This first correction function FX1 is basically, as illustrated in FIG. 3, an increasing function for the load value W input. That is, for a small load, a small first IGV opening command value S1 is output, and for a large load, a large first IGV opening command value S1 is output.

The second correction function FX2 is a function providing a function of making a mass flow rate of air taken in by the compressor 11 equivalent to that at a design standard temperature even if there is a change in the intake air temperature of the compressor 11. The second correction function FX2 is basically, as illustrated in FIG. 4, an increasing function for the intake air temperature value T input. That is, for a low intake air temperature, a small coefficient value N is output, and for a high intake air temperature, a large coefficient value N is output. As illustrated in FIG. 2, by multiplication of the load value W input in a first multiplier 121 by a coefficient value N output from the second correction function FX2, for example, when the temperature is low, the load is made apparently small and the IGV opening is made rather closed. Thereby, increase in the mass flow rate of air associated with increase in air density due to decrease in temperature is prevented, and the mass flow rate of air taken in by the compressor 11 is made equivalent to that at the design standard temperature. On the contrary, for example, when the temperature is high, the load is made apparently large and the IGV opening is made rather open. Thereby, decrease in the mass flow rate of air associated with decrease in air density due to increase in temperature is compensated for, and the mass flow rate of air taken in by the compressor 11 is made equivalent to that at the design standard temperature.

The third correction function FX3 is a function for finding an opening (IGV opening) for the inlet guide vane 22 for generating an amount of combustion air for a load of the gas turbine 10. In the compressor 11, when the IGV opening is large, the surging phenomenon (compressor stall) may be caused by intake of a large amount of air and increase in air density. This third correction function FX3 functions for inhibition of this surging phenomenon. This third correction function FX3 is basically, as illustrated in FIG. 5, an increasing function for the load value W input. That is, for a small load, a small first IGV opening command value S11 is output, and for a large load, a large first IGV opening command value S11 is output.

The fourth correction function FX4 is a function that is used in control of the IGV opening so as to compensate for the flow rate of compressed air returned to the upstream side of the compressor 11 via the extraction air flow channel 43 at the time of anti-icing operation. Basically, as illustrated in FIG. 6, this fourth correction function FX4 is an increasing function for the valve opening command value V input. That is, for a small valve opening command value V, a small coefficient value M is output, and for a large valve opening command value V, a large coefficient value M is output. As illustrated in FIG. 2, in a second multiplier 122, the load value W input is multiplied by the coefficient value M output from the fourth correction function FX4. Thereby, the inlet guide vane 22 is controlled so as to be rather open when the temperature is low and the extraction air flow is large, and combustion air supplied to the combustor 12 is compensated for. That is, the amount of compressed air that has been reduced by the extraction of air for anti-icing is compensated for. The fourth correction function FX4 is an increasing function for the intake air temperature value T.

The fifth correction function FX5 is a function for setting of an IGV opening according to the casing pressure ratio PR at the time of anti-icing operation. At the time of anti-icing operation, when compressed air in the compressor 11 is extracted, the casing pressure ratio PR is reduced and occurrence of the surging phenomenon is mitigated. Since high temperature compressed air is introduced into the compressor 11, the intake air temperature is increased, the opening of the inlet guide vane 22 is increased, and intake air flow rate that inhibits the surging phenomenon is increased more than necessary. The fifth correction function FX5 is a function for inhibiting this phenomenon. The fifth correction function FX5 is basically, as illustrated in FIG. 7, an increasing function for the casing pressure ratio PR input. When the casing pressure ratio PR is low, only a low flow rate of compressed air flowing in is required, and thus the inlet guide vane 22 is adjusted to be closed so as to prevent the amount of air taken in from increasing due to the influence of the anti-icing operation. That is, for a small casing pressure ratio PR, a small IGV opening command value S12 is output, and for a large casing pressure ratio PR, a large IGV opening command value S12 is output.

Specific control in the gas turbine 10 will now be described.

As illustrated in FIG. 2, the temperature sensor 42 detects a temperature in the duct 41, and outputs the detected temperature as an intake air temperature value T to the control device 100. The generator output detector 47 detects an output of the generator 14, and outputs the detected output as a load value W to the control device 100. The casing pressure sensor 45 detects a pressure in the compressor casing 21 in the compressor 11, and outputs the detected pressure as a casing pressure P to the control device 100. The atmospheric pressure sensor 48 detects an atmospheric pressure, and outputs the detected atmospheric pressure as an atmospheric pressure $P_0$ to the control device 100.

In the control device 100, a coefficient value N is found by use of the second correction function FX2 for the intake air temperature value T from the temperature sensor 42, the first multiplier 121 multiplies the load value W from the generator output detector 47 by the coefficient value N, and a first IGV opening command value S1 is calculated by use of the first correction function FX1 (the first opening setting unit 101). Further, in the control device 100, a coefficient value M is found by use of the fourth correction function FX4 for the intake air temperature value T from the temperature sensor 42, the second multiplier 122 multiplies the load value W from the generator output detector 47 by the coefficient value M, and a first IGV minimum opening command value S11 is calculated by use of the third correction function FX3 (the first calculating unit 111 of the second opening setting unit 102).

Further, in the control device 100, a first adder 123 adds the atmospheric pressure $P_0$ from the atmospheric pressure sensor 48 to the casing pressure P from the casing pressure sensor 45, and a first divider 124 divides a value resulting from the addition of the casing pressure P and the atmospheric pressure $P_0$ by the atmospheric pressure $P_0$ to calculate a casing pressure ratio PR (the second calculating unit 112 of the second opening setting unit 102). A second IGV minimum opening command value S12 is found by use of the fifth correction function FX5 for this casing pressure ratio PR. A determiner 125 selects the IGV opening command value S11 or S12 to be adopted according to an ON signal of anti-icing (the opening selecting unit 103).

That is, the control device 100 selects the first IGV minimum opening command value S11 in a state in which an ON signal of anti-icing is not input and anti-icing is not in operation (OFF). A difference calculator 126 calculates a difference ΔS between the selected first IGV minimum opening command value S11 and the first IGV minimum opening command value S11 (the difference calculating unit). Since the selected first IGV minimum opening command value S11 is the same as the first IGV minimum opening command value S11 to be compared therewith, the difference ΔS is calculated to be "0".

On the contrary, the difference calculator 126 selects the second IGV minimum opening command value S12 in a state in which an ON signal of anti-icing is input and anti-icing is in operation (ON). A difference ΔS between the selected second IGV minimum opening command value S12 and the first IGV minimum opening command value S11 is then calculated (the difference calculating unit). When changing the opening of the IGV, a speed limiter 127 performs the change fast when increasing the opening and performs the change slowly when decreasing the opening. An opening limiter 128 corrects the difference ΔS to be between an upper limit and a lower limit (the limiting and correcting unit).

A second adder 129 calculates a second IGV opening command value S2 by adding the difference ΔS to the first IGV minimum opening command value S11. A high value selecting unit 130 compares the first IGV opening command value S1 with the second IGV opening command value S2, and selects the higher IGV opening command value as an IGV opening command value S for the inlet guide vane 22 (the opening selecting unit 103).

As described above, provided in the gas turbine control device of the first embodiment are the first opening setting unit 101 that sets the first IGV opening command value S1 for the inlet guide vane 22 by control different from that of the second opening setting unit 102, the second opening setting unit 102 that sets the second IGV opening command value S2 for the inlet guide vane 22 from the surge limit of the compressor 11 and corrects the second IGV opening command value S2 according to the pressure in the compressor 11, the opening selecting unit 103 that selects the maximum opening as the IGV opening command value S for the inlet guide vane 22 among the first IGV opening command value S1 and the second IGV opening command value S2, and the opening control unit 104 that adjusts the opening of the inlet guide vane 22 according to the IGV opening command value S selected by the opening selecting unit 103.

Therefore, the first IGV opening command value S1 for the inlet guide vane 22 is set by the control different from that of the second opening setting unit 102, for example, from factors excluding the surge limit of the compressor 11, the second IGV opening command value S2 for the inlet guide vane 22 is set from the surge limit of the compressor 11 and corrected according to the pressure in the compressor 11, the maximum opening is selected as the IGV opening command value S for the inlet guide vane 22 among the first IGV opening command value S1 and the second IGV opening command value S2, and the opening of the inlet guide vane 22 is adjusted according to the selected IGV opening command value S for the inlet guide vane 22. Accordingly, the second IGV opening command value S2 for the inlet guide vane 22 found from the surge limit of the compressor 11 is able to be corrected according to the pressure in the compressor 11. When a part of compressed air in the compressor 11 is extracted via the extraction air flow channel 43, the pressure in the compressor 11 is reduced, thereby occurrence of the surging phenomenon in the compressor 11 is mitigated. At this time, the opening for the inlet guide vane 22 is corrected according to the pressure in the compressor 11, thus the intake air flow rate is prevented from increasing more than necessary, and optimum intake air flow rate is able to be obtained for the compressor 11. As a result, carbon monoxide in the exhaust gas is able to be reduced and emission is able to be warranted, and increase in the manufacturing cost due to the enlargement of the facilities is able to be prevented.

In the gas turbine control device of the first embodiment, the pressure in the compressor 11 is at least any one of the casing pressure in the compressor 11, the casing pressure ratio calculated from the outside air pressure and the casing pressure, and an estimated casing pressure or estimated casing pressure ratio estimated based on a pressure at a predetermined position in the compressor 11.

Therefore, by use of the casing pressure, the casing pressure ratio, the estimated casing pressure, or the estimated casing pressure ratio as the pressure in the compressor 11, the second opening is able to be set highly accurately.

In the gas turbine control device of the first embodiment, the second opening setting unit 102 sets the second IGV opening command value S2 from the parameters excluding the pressure in the compressor 11, and the second opening setting unit 102 corrects the second IGV opening command value S2 according to the casing pressure ratio PR. Therefore, by correcting the second IGV opening command value S2 according to the casing pressure ratio PR by the second opening setting unit 102, the intake air flow rate is prevented from increasing more than necessary, and optimum intake air flow rate is able to be realized for the compressor 11.

In the gas turbine control device of the first embodiment, the second opening setting unit 102 has the first calculating unit 111 that sets the first IGV minimum opening command value S11 for the inlet guide vane 22 based on the surge limit in the first state in which a predetermined extraction air flow rate via the extraction air flow channel 43 is obtained, and the second calculating unit 112 that sets the second IGV minimum opening command value S12 for the inlet guide vane 22 based on the surge limit in the second state in which the extraction air flow rate via the extraction air flow channel 43 is larger than that in the first state. Therefore, regardless of whether the extraction air flow rate is large or small, the opening for the inlet guide vane 22 in consideration of the surge limit is able to be set properly.

In the gas turbine control device of the first embodiment, the first calculating unit 111 calculates the first IGV minimum opening command value S11 based on the parameters excluding the casing pressure ratio PR, and the second calculating unit 112 calculates the second IGV minimum opening command value S12 based on the casing pressure ratio PR. Therefore, when the extraction air flow rate is large, the second IGV minimum opening command value S12 is set based on the casing pressure ratio PR and the surge limit, and thus the intake air flow rate is able to be prevented from increasing more than necessary when the extraction air flow rate is large.

In the gas turbine control device of the first embodiment, the second opening setting unit 102 has the difference calculating unit that calculates the difference ΔS between the first IGV minimum opening command value S11 and the second IGV minimum opening command value S12, and the adding unit that adds the difference calculated by the difference calculating unit to the first IGV minimum opening command value S11 calculated by the first calculating unit 111. Therefore, regardless of whether the extraction air flow rate is large or small, the opening for the inlet guide vane 22 in consideration of the surge limit is able to be set properly.

In the gas turbine control device of the first embodiment, the limiting and correcting unit, which corrects the difference ΔS calculated by the difference calculating unit such that the difference ΔS is between the predetermined upper limit and the predetermined lower limit, is provided. Therefore, the difference ΔS is prevented from becoming an abnormal value, and a large increase or decrease in the intake air flow rate due to an abnormal change in the opening of the inlet guide vane 22 is able to be prevented.

In the gas turbine control device of the first embodiment, the first opening setting unit 101 sets the first IGV opening command value S1 for the inlet guide vane 22 based on the inlet temperature of the turbine 13. Therefore, emission is able to be warranted by preventing decrease in temperature of the exhaust gas and increase in carbon monoxide in the exhaust gas.

In the gas turbine control device of the first embodiment, the opening control unit 104 sets the opening speed of the inlet guide vane 22 to be faster than the closing speed thereof. Therefore, by opening the inlet guide vane 22 quickly when the opening of the inlet guide vane 22 is increased, and closing the inlet guide vane 22 slowly when the opening of the inlet guide vane 22 is decreased, a sudden decrease in the temperature of the exhaust gas is able to be prevented and emission is able to be warranted.

In the gas turbine control device of the first embodiment, the extraction air flow channel 43 enables the anti-icing operation of extracting and guiding a part of air compressed in the compressor 11 to the air intake port 20 of the compressor 11. Therefore, freezing in the air intake port 20 is able to be prevented.

Further, provided in a gas turbine control method of the first embodiment are a first opening setting step of setting the first IGV opening command value S1 for the inlet guide vane 22 by control different from that of a second opening setting step, the second opening setting step of setting the second IGV opening command value S2 for the inlet guide vane 22 based on the surge limit of the compressor 11 and correcting the second IGV opening command value S2 according to the pressure in the compressor 11, an opening selecting step of selecting the maximum opening as the IGV opening command value S for the inlet guide vane 22 based on the first IGV opening command value S1 and the second IGV opening command value S2, and an opening control step of adjusting the opening of the inlet guide vane 22 according to the selected IGV opening command value S for the inlet guide vane 22. When a part of compressed air in the compressor 11 is extracted via the extraction air flow channel 43, the pressure in the compressor 11 is reduced, thereby occurrence of the surging phenomenon in the compressor 11 is mitigated. At this time, the opening for the inlet guide vane 22 is corrected according to the pressure in the compressor 11. Thus the intake air flow rate is prevented from increasing more than necessary and optimum intake air flow rate is able to be obtained for the compressor 11. As a result, carbon monoxide in the exhaust gas is able to be reduced and emission is able to be warranted, and increase in the manufacturing cost due to enlargement of the facilities is able to be prevented.

Further, a gas turbine control program causes a computer to execute a first opening setting process of setting the first IGV opening command value S1 for the inlet guide vane 22 by control different from that of the second opening setting process, a second opening setting process of setting the second IGV opening command value S2 for the inlet guide vane 22 based on the surge limit of the compressor 11 and correcting the second IGV opening command value S2 according to the pressure in the compressor 11, an opening selecting process of selecting the maximum opening as the IGV opening command value S for the inlet guide vane 22 based on the first IGV opening command value S1 and the second IGV opening command value S2, and an opening control process of adjusting the opening of the inlet guide vane 22 according to the selected IGV opening command value S for the inlet guide vane 22. When a part of compressed air in the compressor 11 is extracted via the extraction air flow channel 43, the pressure in the compressor 11 is reduced, thereby occurrence of the surging phenomenon in the compressor 11 is mitigated. At this time, the opening for the inlet guide vane 22 is corrected according to the pressure in the compressor 11. Thus the intake air flow rate is prevented from increasing more than necessary, and optimum intake air flow rate is able to be obtained for the compressor 11. As a result, carbon monoxide in the exhaust gas is able to be reduced and emission is able to be warranted, and increase in the manufacturing cost due to the enlargement of the facilities is able to be prevented.

Further, provided in the gas turbine are the compressor 11, the combustor 12, the turbine 13, the inlet guide vane 22 that is provided at the air intake port of the compressor 11 and adjusts the amount of air flowing in, the extraction air flow channel 43 through which a part of air compressed in the compressor 11 is extracted, and the control device 100. Therefore, carbon monoxide in the exhaust gas is able to be reduced and emission is able to be warranted, and increase in the manufacturing cost due to the enlargement of the facilities is able to be prevented.

In the above described first embodiment, the difference ΔS between the first IGV minimum opening command value S11 and the second IGV minimum opening command value S12 is calculated, and the second IGV opening command value S2 is set by adding this difference ΔS to the first IGV minimum opening command value S11. However the first embodiment is not limited to this configuration. For example, when the valve opening command value V=0, the first IGV opening command value S1 may be selected, and when the opening command value V>0, the second IGV opening command value S2 may be selected.

Second Embodiment

Figure 9:
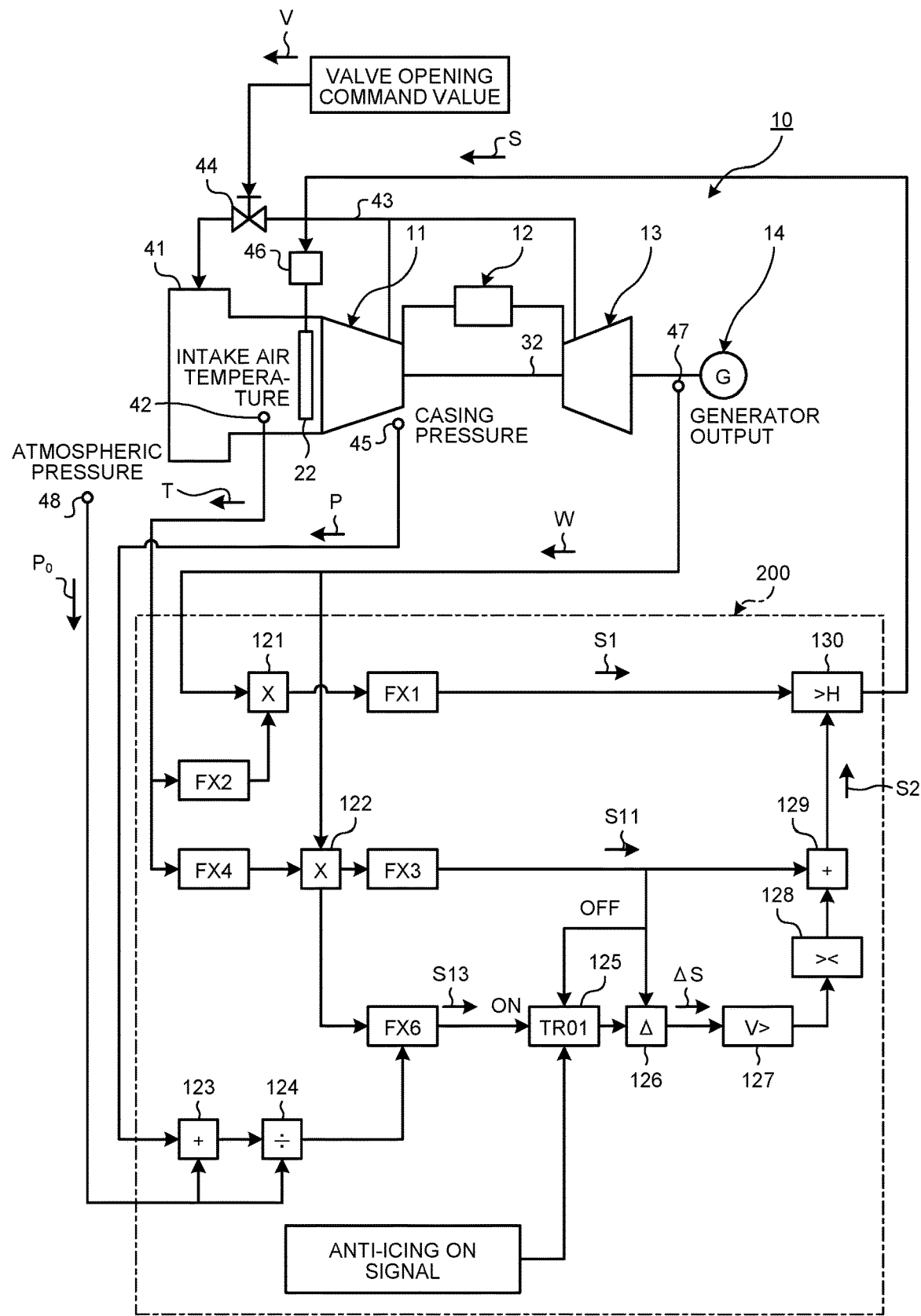
FIG. 9 is a schematic block diagram illustrating a gas turbine control device of a second embodiment.
Figure 10:
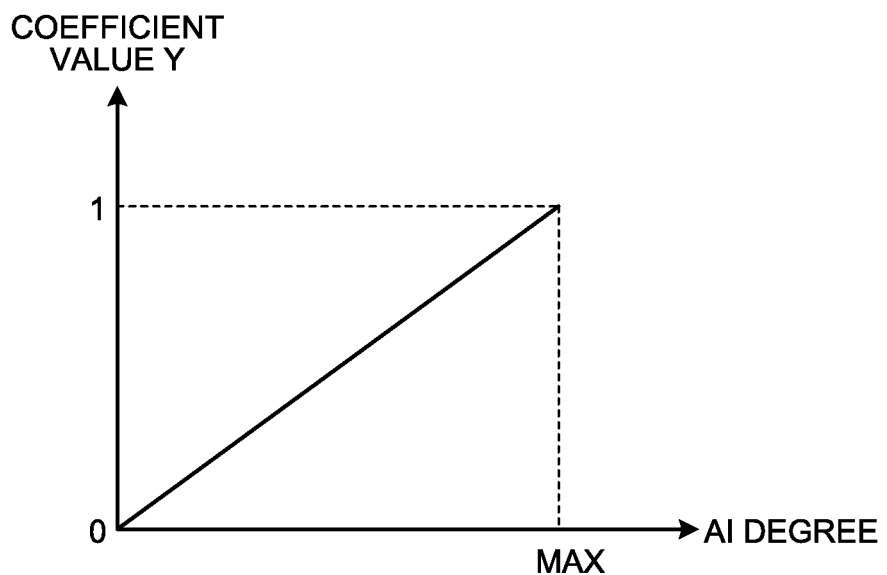
FIG. 10 is a graph representing a sixth correction function.
Figure 11:
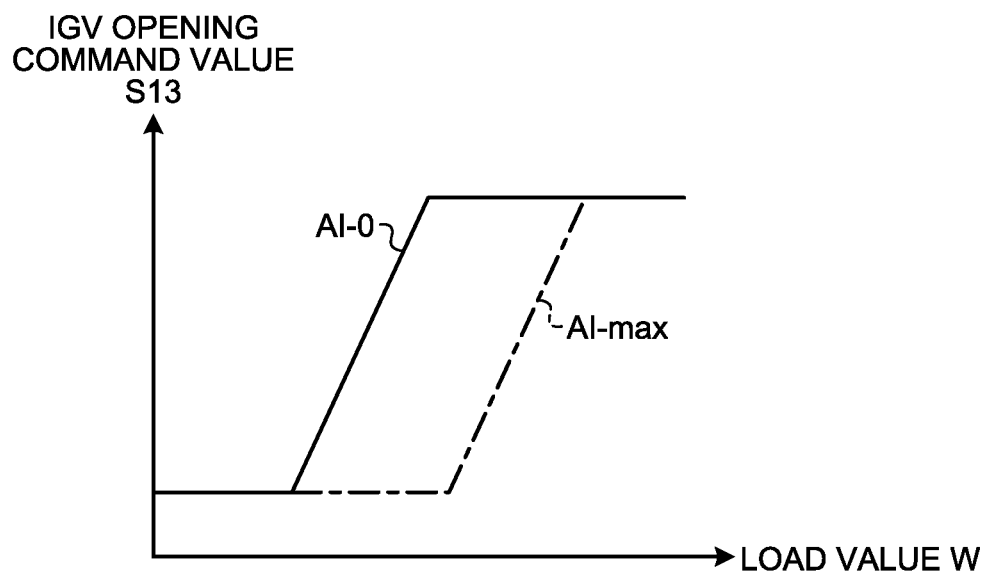
FIG. 11 is a graph for finding an IGV opening from the sixth correction function.

FIG. 9 is a schematic block diagram illustrating a gas turbine control device of a second embodiment, FIG. 10 is a graph representing a sixth correction function, and FIG. 11 is a graph for finding an IGV opening based on the sixth correction function. The same signs will be appended to members having functions that are the same as those of the above described embodiment, and detailed description thereof will be omitted.

The gas turbine control device of the second embodiment adjusts intake air flow rate in the compressor 11 to an optimum value by making the opening of the inlet guide vane 22 a proper opening even when anti-icing is in operation. A control device 200 of the gas turbine 10 illustrated in FIG. 9 has, similarly to the first embodiment, the first opening setting unit 101, the second opening setting unit 102, the opening selecting unit 103, and the opening control unit 104. The second opening setting unit 102 has the first calculating unit 111 and the second calculating unit 112 (see FIG. 1).

Specifically, as illustrated in FIG. 1, the first opening setting unit 101, similarly to the first embodiment, sets a first IGV opening command value S1 for the inlet guide vane 22, based on the intake air temperature value T, and the load value W. The first calculating unit 111 sets the second IGV opening command value S2 for the inlet guide vane 22 when anti-icing is not in operation based on the intake air temperature value T and the load value W in consideration of the surge limit of the compressor 11 according to a casing pressure ratio PR. The second calculating unit 112 sets the second IGV opening command value S2 for the inlet guide vane 22 when anti-icing is in operation based on the intake air temperature value T and the load value W in consideration of the surge limit of the compressor 11 according to the casing pressure ratio PR. The second opening setting unit 102 then sets the second IGV opening command value S2 according to an operation degree of anti-icing (AI degree).

The control device 200 of the second embodiment sets the IGV opening command value S for the inlet guide vane 22 by using the first correction function FX1, the second correction function FX2, the third correction function FX3, and the fourth correction function FX4 of the first embodiment, and uses a sixth correction function FX6 instead of the fifth correction function FX5.

The sixth correction function FX6 is a function for setting the IGV opening according to a casing pressure ratio PR at the time of anti-icing operation. The sixth correction function FX6 is a function for preventing a phenomenon in which the opening of the inlet guide vane 22 increases and the intake air flow rate increases more than necessary at the time of anti-icing operation. The operation degree of anti-icing is set according to the casing pressure ratio PR. That is, since the casing pressure P changes according to the opening of the flow regulating valve 44, a relation between the opening of the flow regulating valve 44 and the casing pressure P is predetermined. When the opening of the flow regulating valve 44 is "0" and the casing pressure P is at a predetermined value, the operation degree of anti-icing is "0". On the contrary, when the opening of the flow regulating valve 44 is maximum and the casing pressure P is at another predetermined value, the operation degree of anti-icing is maximum. The sixth correction function FX6 is, basically, as illustrated in FIG. 10, a function for the AI degree according to the casing pressure ratio PR input, and outputs a coefficient value Y (0 to 1.0) for an AI degree (a casing pressure ratio PR).

Specific control in the gas turbine 10 will now be described.

As illustrated in FIG. 9, in the control device 200, the coefficient value N is found by use of the second correction function FX2 for the intake air temperature value T from the temperature sensor 42, the first multiplier 121 multiplies the load value W from the generator output detector 47 by the coefficient value N, and the first IGV opening command value S1 is calculated by use of the first correction function FX1 (the first opening setting unit 101). Further, in the control device 200, the coefficient value M is found by use of the fourth correction function FX4 for the intake air temperature value T from the temperature sensor 42, the second multiplier 122 multiplies the load value W from the generator output detector 47 by the coefficient value M, and the second IGV opening command reference value S11 is calculated by use of the third correction function FX3 (the second opening setting unit 102).

Further, in the control device 200, the first adder 123 adds the atmospheric pressure $P_0$ from the atmospheric pressure sensor 48 to the casing pressure P from the casing pressure sensor 45, and the first divider 124 divides the value resulting from the addition of the casing pressure P and the atmospheric pressure $P_0$ by the atmospheric pressure $P_0$ to calculate a casing pressure ratio PR (the second opening setting unit 102). Then the coefficient value Y according to the operation degree of anti-icing is set based on the value obtained by the second multiplier 122 multiplying the load value W by the coefficient value M, the casing pressure ratio PR, and the sixth correction function FX6, and finds a second IGV minimum opening command value S13 by using a map of IGV opening for the load value W as illustrated in FIG. 11. In the map of IGV opening for the load value W as illustrated in FIG. 11, a type of in which AI is set to be 0 (AI=0) for no operation of anti-icing and another type in which AI is set to be maximum (AI=maximum) for operation of anti-icing are predetermined, and the second IGV minimum opening command value S13 is output based on the coefficient value Y of the sixth correction function FX6.

The determiner 125 selects the IGV opening command value S11 or S13 to be adopted according to the ON signal of anti-icing (the opening selecting unit 103).

That is, the control device 200 selects the first IGV minimum opening command value S11 when the ON signal of anti-icing is not input (OFF). On the contrary, the difference calculator 126 selects the second IGV minimum opening command value S13 when the ON signal of anti-icing is input and anti-icing is in operation (ON). A difference ΔS between the selected second IGV minimum opening command value S13 and the first IGV minimum opening command value S11 is then calculated. On changing the IGV opening, the speed limiter 127 changes the IGV opening quickly when increasing the IGV opening and changes the IGV opening slowly when decreasing the IGV opening. The opening limiter 128 corrects the difference ΔS to be between an upper limit and a lower limit. The second adder 129 calculates the second IGV opening command value S2 by adding the difference ΔS to the first IGV minimum opening command value S11.

The high value selecting unit 130 compares the first IGV opening command value S1 with the second IGV opening command value S2, and selects the higher IGV opening command value as the IGV opening command value S for the inlet guide vane 22 (the opening selecting unit 103).

As described above, in the gas turbine control device of the second embodiment, the second opening setting unit 102 has the opening correcting unit that corrects the second IGV minimum opening command value S12 according to the casing pressure ratio PR, and the adding unit that adds the difference ΔS between the first IGV minimum opening command value S11 and the corrected second IGV minimum opening command value S13 to the first IGV minimum opening command value S11.

Therefore, the second IGV minimum opening command value S12 when the extraction air flow rate is large is corrected and the difference ΔS between the first IGV minimum opening command value S11 and the corrected second IGV minimum opening command value S13 to the first IV minimum opening command value S11, and thereby the opening for the inlet guide vane 22 according to the casing pressure ratio PR is able to be set properly. In this case, the operation degree of anti-icing is calculated according to the casing pressure ratio PR, the second IGV opening command value S2 is set based on the sixth correction function FX6 according to the operation degree of anti-icing, and thereby, the opening for the inlet guide vane 22 is able to be properly set easily by existing sensors.

In the above described embodiments, the casing pressure ratio is applied as the pressure of the compressor for correction of the second opening for the inlet guide vane based on the surge limit of the compressor. However, the embodiments are not limited to this configuration. For example, the pressure may be the casing pressure, or the casing pressure or the casing pressure ratio may be calculated or estimated based on the pressure at each stage, an inlet portion, and an output portion in the compressor.

Further, in the above described embodiments, the first opening setting unit and the second opening setting unit set the IGV opening command values for the inlet guide vane by the intake air temperature value and the load value. However, the embodiments are not limited to this configuration. For example, the IGV opening command value for the inlet guide vane may be set based on a temperature of the exhaust gas.

Further, in the above described embodiments, the extraction air flow channel which returns compressed air to the air intake port of the compressor for anti-icing function is applied. However the embodiments are not limited to this configuration. For example, the extraction air flow channel through which compressed air is discharged to an exhaust duct may be applied.

Further, in the above described embodiments, each of the opening setting units 101 and 102 is configured to adjust the opening of the inlet guide vane 22 based on the intake air temperature of the compressor 11. However the embodiments are not limited to this configuration. For example, the opening of the inlet guide vane 22 may be adjusted based on an outside air temperature.

Further, in the above described second embodiment, the sixth correction function FX6 is set according to the casing pressure ratio PR. However the second embodiment is not limited to this configuration. For example, the sixth correction function FX6 may be set based on the opening of the flow regulating valve 44, or the flow rate in the extraction air flow channel 43.

Although this application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A gas turbine control device in a gas turbine comprising:
   a compressor;
   a combustor;
   a turbine;
   an inlet guide vane provided at an air intake port of the compressor and configured to adjust an amount of air flowing into the compressor; and
   an extraction air flow channel through which a part of air compressed by the compressor is extracted,
   wherein the gas turbine control device has:
      a second opening setting unit configured to set a second opening for the inlet guide vane based on a surge limit of the compressor and correct, in a state in which the part of air compressed by the compressor is guided through the extraction air flow channel to the air intake port of the compressor, the second opening based on a pressure in the compressor;
      a first opening setting unit configured to set a first opening for the inlet guide vane by control different from that of the second opening setting unit;
      an opening selecting unit configured to select a maximum opening as an opening for the inlet guide vane among the first opening and the second opening; and
      an opening control unit configured to adjust the opening of the inlet guide vane based on the maximum opening for the inlet guide vane selected by the opening selecting unit, wherein
   the second opening setting unit has a first calculating unit configured to set a first minimum opening for the inlet guide vane selected in a first state in which a part of the air compressed by the compressor is guided through the extraction flow channel to the turbine and is not guided to the air intake port of the compressor, and a second calculating unit configured to set a second minimum opening for the inlet guide vane selected in a second state in which a part of the air compressed by the compressor is guided through the extraction air flow channel to the turbine and is guided to the air intake port of the compressor, and
   the second opening setting unit has a difference calculating unit configured to calculate a difference between the first minimum opening and the second minimum opening, and an adding unit configured to add the difference calculated by the difference calculating unit to the first minimum opening set by the first calculating unit.

2. The gas turbine control device according to claim 1, wherein the first opening setting unit is further configured to set the first opening for the inlet guide vane based on factors excluding the surge limit of the compressor.

3. The gas turbine control device according to claim 1, wherein the pressure in the compressor is at least any one of a casing pressure in the compressor, a casing pressure ratio calculated based on an atmospheric pressure and the casing pressure, and at least one of an estimated casing pressure and an estimated casing pressure ratio estimated based on a pressure at a predetermined position in the compressor.

4. The gas turbine control device according to claim 3, wherein the second opening setting unit is further configured to set the second opening based on parameters excluding the pressure in the compressor and correct the second opening based on the casing pressure ratio.

5. The gas turbine control device according to claim 1, wherein the first calculating unit is further configured to calculate the first minimum opening based on parameters excluding the pressure in the compressor, and the second calculating unit is further configured to calculate the second minimum opening based on the pressure in the compressor.

6. The gas turbine control device according to claim 1, wherein a limiting and correcting unit configured to correct the difference calculated by the difference calculating unit such that the difference is between a predetermined upper limit and a predetermined lower limit is provided.

7. The gas turbine control device according to claim 1, wherein
   the second opening setting unit has an opening correcting unit configured to correct the second minimum opening based on the pressure in the compressor,
   the difference calculated by the difference calculating unit is the difference between the first minimum opening and the corrected second minimum opening, and
   the adding unit adds the difference between the first minimum opening and the corrected second minimum opening calculated by the difference calculating unit to the first minimum opening calculated by the first calculating unit.

8. The gas turbine control device according to claim 1, wherein the first opening setting unit is further configured to set a minimum opening for the inlet guide vane based on an inlet temperature of the turbine.

9. The gas turbine control device according to claim 1, wherein the opening control unit is further configured to set an opening speed of the inlet guide vane to be faster than a closing speed of the inlet guide vane.

10. The gas turbine control device according to claim 1, wherein the extraction air flow channel is further configured to extract the part of air compressed by the compressor and then guide the part of air compressed by the compressor to the air intake port of the compressor.

11. A gas turbine control method in a gas turbine comprising: a compressor; a combustor; a turbine; an inlet guide vane provided at an air intake port of the compressor and configured to adjust an amount of air flowing into the compressor; and an extraction air flow channel through which a part of air compressed by the compressor is extracted; comprising:

a second opening setting step of setting a second opening for the inlet guide vane based on a surge limit of the compressor, and correcting, in a state in which the part of air compressed by the compressor is guided through the extraction air flow channel to the air intake port of the compressor, the second opening based on a pressure in the compressor;

a first opening setting step of setting a first opening for the inlet guide vane by control different from that of the second opening setting step;

an opening selecting step of selecting a maximum opening as an opening for the inlet guide vane among the first opening and the second opening; and an opening control step of adjusting the opening of the inlet guide vane based on the maximum opening for the inlet guide vane, wherein the second opening setting step includes (i) setting a first minimum opening for the inlet guide vane selected in a first state in which a part of the air compressed by the compressor is guided through the extraction air flow channel to the turbine and is not guided to the air intake port of the compressor, and (ii) setting a second minimum opening for the inlet guide vane selected in a second state in which a part of the air compressed by the compressor is guided through the extraction air flow channel to the turbine and is guided to the air intake port of the compressor, and the second opening setting step includes (i) calculating a difference between the first minimum opening and the second minimum opening, and (ii) adding the calculated difference to the first minimum opening.

12. A non-transitory storage medium that stores a gas turbine control program in a gas turbine comprising: a compressor; a combustor; a turbine; an inlet guide vane provided at an air intake port of the compressor and configured to adjust an amount of air flowing into the compressor; and a extraction air flow channel through which a part of air compressed by the compressor is extracted, that causes a computer to execute:

a second opening setting step of setting a second opening for the inlet guide vane based on a surge limit of the compressor, and correcting, in a state in which the part of air compressed by the compressor is guided through the extraction air flow channel to the air intake port of the compressor, the second opening based on a pressure in the compressor;

a first opening setting step of setting a first opening for the inlet guide vane by control different from that of the second opening setting step;

an opening selecting step of selecting a maximum opening as an opening for the inlet guide vane among the first opening and the second opening; and an opening control step of adjusting the opening of the inlet guide vane based on the maximum opening for the inlet guide vane, wherein the second opening setting step includes (i) setting a first minimum opening for the inlet guide vane selected in a first state in which a part of the air compressed by the compressor is guided through the extraction air flow channel to the turbine and is not guided to the air intake port of the compressor, and (ii) setting a second minimum opening for the inlet guide vane selected in a second state in which a part of the air compressed by the compressor is guided through the extraction air flow channel to the turbine and is guided to the air intake port of the compressor, and the second opening setting step includes (i) calculating a difference between the first minimum opening and the second minimum opening, and (ii) adding the calculated difference to the first minimum opening.

* * * * *